United States Patent [19]

Kaneda et al.

[11] Patent Number: 4,459,661
[45] Date of Patent: Jul. 10, 1984

[54] CHANNEL ADDRESS CONTROL SYSTEM FOR A VIRTUAL MACHINE SYSTEM

[75] Inventors: Saburo Kaneda; Masamichi Ishibashi; Yoshikatsu Seta; Fujio Ikegami, all of Kanagawa, Japan

[73] Assignee: Fujitsu Limited, Kawasaki, Japan

[21] Appl. No.: 370,193

[22] Filed: Apr. 21, 1982

Related U.S. Application Data

[63] Continuation of Ser. No. 075,167, Sep. 12, 1979, abandoned.

[30] Foreign Application Priority Data

Sep. 18, 1978 [JP] Japan ............................. 53-114345

[51] Int. Cl.³ .............................................. G06F 3/00
[52] U.S. Cl. ................................................... 364/200
[58] Field of Search ... 364/200 MS File, 900 MS File

[56] References Cited

U.S. PATENT DOCUMENTS

| | | | |
|---|---|---|---|
| 3,723,976 | 5/1973 | Alvarez et al. | 364/200 |
| 3,786,427 | 1/1974 | Schmidt et al. | 364/200 |
| 3,787,813 | 1/1974 | Cole et al. | 364/200 |
| 3,828,327 | 8/1974 | Berglund et al. | 364/200 |
| 4,037,215 | 7/1977 | Birney et al. | 364/200 |
| 4,044,334 | 8/1977 | Bachman et al. | 364/200 |
| 4,084,227 | 4/1978 | Bennett et al. | 364/200 |
| 4,092,715 | 5/1978 | Scriver | 364/200 |
| 4,104,718 | 8/1978 | Poublan et al. | 364/200 |
| 4,128,875 | 12/1978 | Thurber et al. | 364/200 |
| 4,149,244 | 4/1979 | Anderson et al. | 364/200 |
| 4,155,119 | 5/1979 | DeWard et al. | 364/200 |
| 4,253,145 | 2/1981 | Goldberg | 364/200 |

OTHER PUBLICATIONS

Boggs "Virtual I/O Channels for a Digital Computer", LBU TDB, vol. 20, No. 1, 1977, 110-112.
"Survey of Virtual Machine Research" by Robert Goldberg, Computer, Jun. 1974, pp. 34-45.
"The Evolution of Virtual Machine Architecture" by T. P. Buzen et al., National Computer Conf., 1973, pp. 291-299.
"Virtual Storage and Virtual Machine Concept" by R. P. Parmelee et al., IBM System Journal, 1972, No. 2, pp. 99-130.

*Primary Examiner*—Eddie P. Chan
*Attorney, Agent, or Firm*—Staas & Halsey

[57] ABSTRACT

A virtual machine system having a virtual storage function, wherein registers are provided for holding the heading and trailing addresses of the continuous area in the main storage area assigned respectively for each of the plural operating systems. When the main storage area is accessed by a channel or sub-channel, one of the registers is selected, and the heading address of the register selected is added to the main storage address sent from the channel or sub-channel. The added main storage address is compared with the trailing address in the selected register and if the former is smaller than the latter, the overhead for supporting the virtual storage area is reduced by accessing the main storage area in accordance with the added main storage address mentioned above.

14 Claims, 14 Drawing Figures

ADDRESS TRANSLATION USING SHADOW TABLE

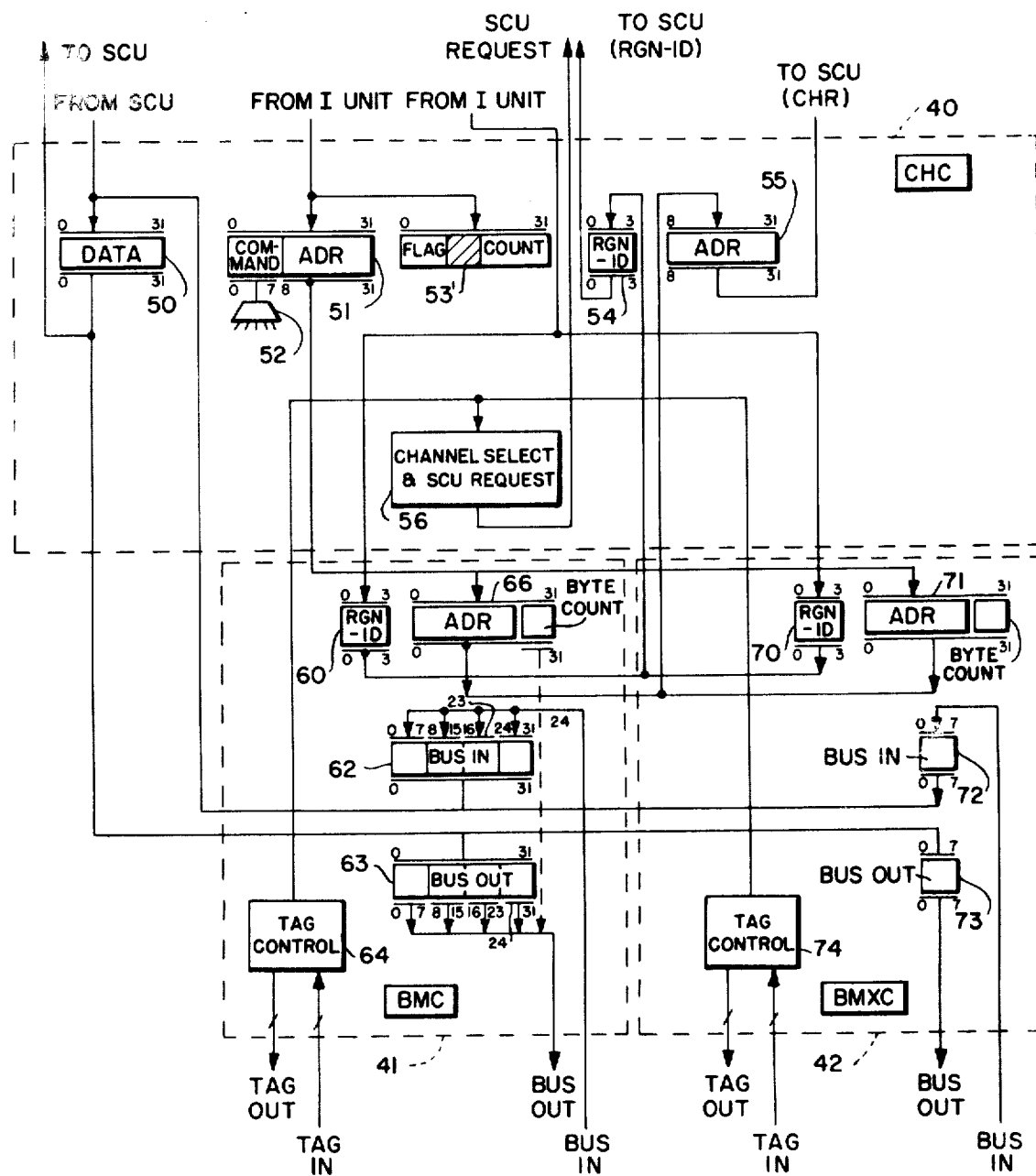

CHANNEL ADDRESS CONTROL SYSTEM FOR A VIRTUAL MACHINE SYSTEM

This is a continuation of Application Ser. No. 075,167, filed Sept. 12, 1979, now abandoned.

BACKGROUND OF THE INVENTION (1) Field of the Invention

This invention relates to a channel address control system for a virtual machine system, particularly to a channel address control system for a virtual machine system providing a virtual storage function.

(2) Description of the Prior Art

In recent years, the concept of a "virtual machine" has been introduced and various attempts have been made to put it into practical use. The concept of a virtual machine is described in detail, for example, in the "IBM SYSTEM JOURNAL" 1972, No. 2. The advantages of the virtual machine can be summarized by the following two points:

(1) Users employing this machine system can obtain results similar to the results obtained from a single hardware machine system.

(2) It is possible to provide virtual machine systems that have a different architecture or a different structure.

Therefore, by using a virtual machine system, it is possible to simultaneously run the programs under the control of an operating system (OS) and flexibly modify the system structure. Thus, monitoring of the operating conditions of the system becomes possible and users can effectively use a debugging function which is provided. FIG. 1 illustrates the concept of an existing general machine system, and FIG. 2 shows the concept of a virtual machine system. In FIG. 1 and FIG. 2, a real machine system refers to actual machine hardware. The operating system (OS) monitors each program and controls the use of the machine resources (central processing unit, main storage area, channel, input/output control unit, input/output device and system console, etc.) by each program. In addition, a conceptual interface described in the drawings as a hardware interface is set up between the operating system and the real machine. A user program/OS interface is set up between user programs and the operating system. In the virtual machine system shown in FIG. 2, a program called a virtual machine monitor (VMM) monitors a plurality of operating systems (OS#o to OS#m) so that each program can use the machine resources. The portion enclosed by the dotted line on FIG. 2 is an existing general machine system called a virtual machine (VM). A plurality of virtual machines may be run under the control of the virtual machine system.

Currently a multiprogramming technique is widely used for the effective operation of machine systems, and each program commonly uses the system resources (central processing unit, main storage data, channel, input/output control unit, input/output device and system console etc.).

The system resources are monitored by the operating system and usually access to the system resources can be had only by an instruction issued by the operating system. This instruction is called a "priviledged instruction".

Each user program is assigned a "non-priviledged mode", and when the user program issues the "priv-ledged instruction", a program interruption called an "exceptional privileged instruction" is detected.

In the case of a virtual machine system, plural operating systems are capable of running simultaneously, and therefore the system resources are monitored by the program called a virtual machine monitor (VMM) instead of by each operating system. Programs of each virtual machine (VM#o to VM#m), including the operating system, are all assigned the "non-privileged mode", and only the virtual machine monitor (VMM) operates on the "privileged mode". Thus, when the operating system of one of the virtual machines tries to use the "privileged instruction", program interruption is detected, execution control is handed to the virtual machine monitor, and the virtual machine monitor simulates a "privileged instruction".

In the virtual machine described above, several operating systems run simultaneously and therefore to obtain desired performance, it is necessary to provide space in the main storage area of the real machine equal to (usual space) x (number of operating systems). In present virtual machine systems a virtual memory system is used due to a problem of the cost of main storage area. When a virtual memory system is used, the main storage area is monitored by the virtual machine monitor as will be explained below. Therefore, the role of the virtual machine monitor can be outlined as follows:

(1) Effectively controlling each user program (and operating system) to supervise the efficient use of the system resources (2) Simulating the "privileged instruction" issued from each operating system (3) Receiving all interruptions (including I/O interruption, external interruption and interruption related to the virtual storage area), executing processing according to the interruption causes and informing, if necessary, each operating system of the interruption (4) Monitoring of the main storage area in the virtual machine system as explained below.

FIG. 3 illustrates the address space in the virtual machine system. FIG. 4 shows an embodiment of the address space. In this example, the operating systems controlled by the virtual machine system employ a virtual storage system. In FIG. 3, the virtual address and the real address are addresses in the virtual storage area being monitored by the operating system, and dynamic address translation (DAT) is realized by using the address translation table monitored by the operating system. In the general machine system (not a virtual machine system), this real address corresponds to the main storage address, but in the virtual machine system, since a plurality of operating systems exist simultaneously, space in the main storage area of the host machine runs short. For this reason, the real address being monitored by the operating system is considered as the logical address in the host machine, and the main storage area of the host machine is monitored by the virtual machine monitor. This is called double paging. Double paging causes considerable overhead in the preformance. Thus, in order to realize high speed operation it has been proposed that a table (called a shadow table) be prepared. The shadow table is obtained by combining two DAT tables for the virtual machine monitor. The virtual machine monitor monitors a corresponding table between the logical address monitored by the operating system and the main storage address of the host machine.

If any of the aforementioned DAT tables is modified, it must be reflected on the shadow table, and this processing is performed by the virtual machine monitor. FIG. 4 illustrates an example where the logical page address 16 being monitored by the operating system corresponds to the real page address 100 of the host machine being monitored by the virtual machine monitor. In FIG. 4, A indicates the DAT table generated by the operating system and the logical page address 16 is copied from the real page address 6. The DAT table C is generated by the virtual machine monitor and the real page address 6 of the operating system is copied from the real page address 100 of the host machine. B is the shadow table and the logical page address 16 is copied to the real page address 100 of the host machine.

Explained above is the monitoring of the main storage area in the central processing unit (CPU), but the following explains the channel processing performed by the virtual machine monitor. When the operating system of virtual machine system issues an input/output device starting instruction, this instruction is a privileged instruction and is output to the virtual machine monitor. The channel program required for the operating system in the virtual machine system to start the input/output devices is described by the real address monitored by the operation system. Therefore, the virtual machine monitor generates this channel program in the main storage area monitored by the virtual machine monitor, for reconversion of the data address, the command control word (CCW) address, etc. into the real addresses on the host machine. Thus, CCW modification by user program is not supported.

A virtual machine system has various merits as described in the beginning of this specification, but if a certain program is run under the control of a virtual machine system, performance is degraded to a certain degree due to the overhead which is peculiar to the virtual machine system. The overhead can be classified into direct overhead and indirect overhead as indicated below.

(1) Direct overhead:

An overhead, mainly occurring during processing in accordance with the software of a virtual machine monitor, which can be categorized as follows:

(a) Overhead due to simulation of the privileged instruction

Since each user program including the operating system used are given assignment of the "non-privileged mode" as explained above, the privileged instruction issued by the operating systems are all simulated by the virtual machine monitor.

(b) Overhead for changing each user program (c) Overhead for supporting the virtual storage function of the operating system This is an overhead for monitoring the shadow table mentioned above.

(d) Overhead for channel program conversion

Since the channel program used by the operating system for starting the input/output device is the logical address for the host machine system, it is converted to the real address of the host machine system by the virtual machine monitor.

(e) Overhead for supporting interruption

Since all interruptions are detected by the virtual machine monitor, if such interruption is necessary, it must be reflected by the operating system, and such processing is performed by the virtual machine monitor.

(f) Support of console functions

The virtual machine system monitor supports the console functions including the debugging function (2) Indirect overhead:

The operating system currently used comprises various algorithms for the method of assignment and for monitoring the resources to obtain highly efficient application of system resources, but if these are run under the control of the virtual machine system, the reverse effect results. As already explained, the virtual machine system has various merits but it also causes performance deterioration.

SUMMARY OF THE INVENTION

In order to suppress degradation of performance of the virtual machine system, an object of the present invention is to eliminate "overhead for supporting the virtual storage function of the operating system". To attain this object, the present invention employs a virtual machine system wherein plural control programs and a monitor program for monitoring the plural control programs are provided. The plural control programs are operated on one machine system under the control of the monitor program and a continuous area of the main storage area is exclusively assigned to each of the plural control programs or in common to plural control programs. The main storage area is accessed by addressing the area assigned to each of the control programs or each group of plural control programs.

The system includes one or more registers for storing the heading address and trailing address of the main storage area assigned to each control program and a means for transmitting the information for identifying this area to the channel or sub-channel; a means for storing the information for identifying this area to the channel or sub-channel; a means for adding the heading address of the area in the register selected by the information for identifying the area to the main storage address sent from the channel or sub-channel; and a means for comparing the added main storage address and the trailing address of the area in the selected register.

In the present invention, a continuous real space on the main storage area of the host machine (this space is called a region) is assigned for each user, thus eliminating any overhead concerning the double paging.

The present invention can also be applied to the buffer storage area of the main storage area. In FIG. 5, the base register and limit register are registers holding the start address and end address of the region with the absolute address and are used when the main storage area is accessed by the central processing unit. In addition, the MPRFX register is used for indicating the prefix region of the virtual machine monitor. The AMR register holds the start address and end address of the region prepared in a channel with the absolute address and is used when the main storage area is accessed by a channel.

The address modification process in the CPU is as follows. The main storage area is accessed by using an address to which the value of the BASE register is added to obtain the absolute address generated when the main storage area is accessed by the CPU. This is called an "address shift". This added address is compared with the value of the LIMIT register and when the form is larger, a program interruption of address exception occurs.

FIG. 6 shows the process of address translation and FIG. 7 illustrates the concept of an address shift. In FIG. 6, a logical address is translated to the real address by the DAT translation, the real address is then translated to the absolute address by the prefixing, and the absolute address is then translated to the system absolute address by the address shift.

In FIG. 7, the value of the BASE register is added to the upper bit of the absolute address and is converted to the system absolute address. Next, the upper limit address is generated from the LIMIT register and the system absolute address and the upper limit address are compared. The virtual machine monitor loads the heading address of the region assigned to a virtual machine system when dispatching the virtual machine system to the BASE register and the trailing address to the LIMIT register. Thus, during the operation of the virtual machine system, access to a region other than that assigned to the virtual machine system is inhibited by the hardware.

Address modification in a channel is performed as explained below. If the main storage area is accessed by a channel, "address shift" is conducted as in the case of the CPU. Employment of the "address shift" makes possible the support of "CCW modification by user programs" which has not been supported by the existing virtual machine system.

For channel address modification, several registers called AMR are provided and the type of register is the same as the BASE register and LIMIT register in the CPU. In addition, address calculation of "address shift" is also carried out in the same way as in the CPU. For several AMR registers, the number called the region identifier is given and the virtual machine monitor sets up each region and interrelation between the heading and trailing addresses of such region using a special instruction.

With a method explained below, a region identifier is transmitted to a channel or sub-channel via the CPU/channel control device and the region identifier is stored by the channel or sub-channel. Then, the storage area accessed by means of the channel is subject to address modification by "address shift" of the AMR register corresponding to a region number indicated by the region identifier. FIG. 8 shows the AMR register structure.

There are two methods for transmitting a region identifier to the channel/sub-channel. In the 1st method, a region identifier is transmitted using a channel command. For this purpose, a channel command called TVM is provided and this command indicates a region identifier for the channel. When this command is executed by the channel, succeeding storage area access by the channels is subject to the address modification due to "address shift" of the AMR register corresponding to the region number. FIG. 9 illustrates a type of TVM command.

Actually, an instruction for an operating system of a virtual machine system to start the input/output devices is processed by the virtual machine monitor as explained below. When the operating system of a virtual machine system issues an instruction for starting input/output devices, this instruction is detected by the virtual machine monitor because it is a privileged instruction. The virtual machine monitor gives the TVM command which designates the corresponding region identifier at the heading part of the channel program and reissues an instruction for starting the input/output devices.

FIG. 10 illustrates the concept of channel program execution. In FIG. 10 ① is a channel program prepared by the operation system of the virtual machine #2. ② is a channel program prepared by the user program, ③ is a TVM command prepared for the virtual machine monitor to transmit the region identifier "2" to the channel. The next CCW address indicates ① with the relative address in the region #2.

FIG. 13 shows the channel control device using the method shown in FIG. 10 and a channel block diagram. In the 2nd method for transmitting a region identifier to the channel/sub-channel, a region identifier storing register is used. A register for storing a region identifier of the virtual machine system which is now executing instructions is provided in the CPU or channel control device, and when the CPU detects an input/output instruction, the channel control unit transmits the content of the register to the channel/sub-channel. The succeeding main storage area accessed by the channels is subject to address modification by "address shift" of the AMR register corresponding to the region number. FIG. 14 shows the channel control unit in this method and channel block diagram.

BRIEF DESCRIPTION OF THE DRAWINGS

FIG. 14 is a block diagram of another embodiment of the channel control unit and channel.

DESCRIPTION OF THE PREFERRED EMBODIMENTS

Figure 11:
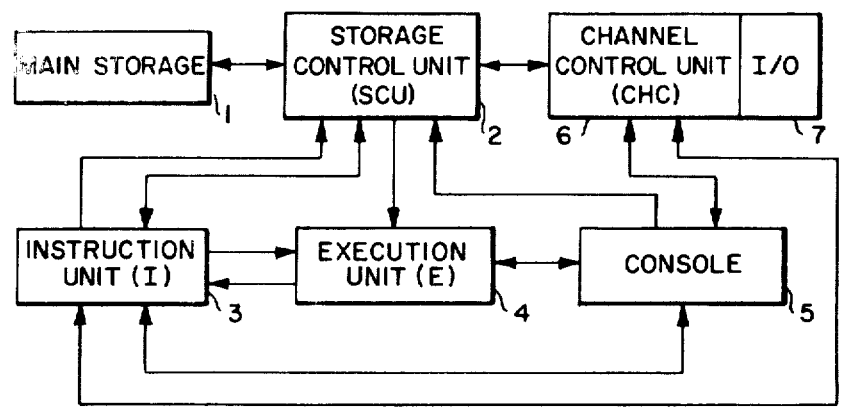
FIG. 11 is a block diagram of an embodiment of the real machine system hardware.

FIG. 11 is a block diagram of an embodiment of the real machine system hardware which operates as a virtual machine system.

In this figure, 1 is a main storage area; 2 is a storage control unit (SCU); 3 is an instruction unit (I); 4 is an execution unit (E); 5 is a console; 6 is a channel control unit (CHC); 7 is an input/output unit (I/O). The present invention mainly relates to the storage control unit (SCU) and channel control unit (CHC) in FIG. 11.

Figure 12:
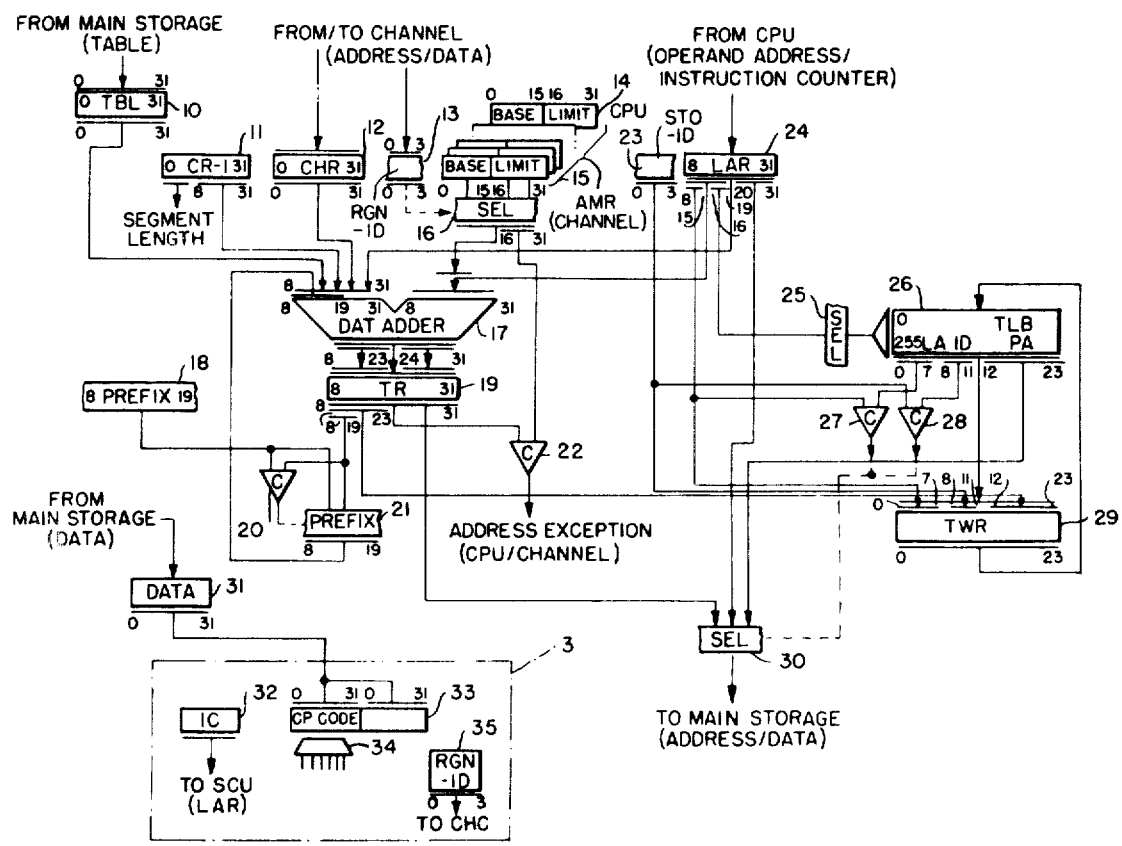
FIG. 12 is a block diagram of the storage control unit (SCU).

A block diagram of the storage control unit (SCU) and a part of the instruction unit 3 (I) are shown in FIG. 12. In FIG. 12, 10 is a TBL register; 11 is a CR1 register; 12 is a CHR register; 13 is an RGN-ID register, 14 is a base register, limit register; 15 is an AMR register; 16 is a selection gate; 17 is a DAT adder; 18 is a prefix register; 19 is a TR register; 20 is a comparator circuit; 21 is a prefix circuit; 22 is a comparator circuit; 23 is an STO-ID register; 24 is an LAR register; 25 is a selection gate; 26 is a TLB buffer; 27, 28 are comparator circuits; 29 is a TWR register; 30 is a selection gate; 31 is a DATA register; 32 is an instruction counter; 33 is an instruction buffer; 34 is a decoder; 35 is an RGN-ID register.

The TBL register 10 holds the address translation table data read out from the main storage area. The CR 1 register 11 holds the segment length and segment table heading address of the address translation table. The CHR register 12 holds an address and data when a storage access request is issued from the channels. The RGN-ID register 13 holds the region identifier which is sent from the channels together with an address when a storage access request is issued from the channels. The AMR register 15 holds the information used to modify the address sent from the channels. The STO-ID register 23 holds the currently effective STO number among the STO stacks prepared in the CPU. The STO-ID register 23 is compared with the ID being held in the TLB 26 to see if the corresponding TLB entry is the relevant one or not. The LAR register 24 holds the logical addresses used to access the operand and instruction in the main storage area from the CPU. This register is used for comparison with the content of TLB and access to the DAT table. The TLB 26 is a buffer for high speed address translation without indexing the DAT table in the main storage area. The TLB 26 is indexed by using part of the logical address information. The bits of the logical page address which are not used for indexing, the physical page address corresponding to the logical page address, and the value of STO-ID when the TLB entry is registered are stored in one entry of the TLB 26. Usually, the logical address in the LAR register 24 is translated into a physical address by indexing TLB 26. The TWR register 29 is used for reading or writing data to/from the TLB 26.

Operation of FIG. 12 is as follows. The real dynamic logical address is obtained by hardware on the basis of the base register, index register designated in the program and relative address in page and then set in the LAR register 24. This logical address can be divided into segment number, page number, and in-page relative address. A part of the segment number and page number are transmitted to TLB 26 through the selection gate 25, whereby the corresponding TLB entry is read out. Thus, the logical address part read out from the TLB 26 and a part of the segment number in the LAR register 24 which is not used for TLB indexing are compared by the comparator circuit 27. Simultaneously, the content of STO-ID register 23 and the ID part of the TLB entry are compared by the comparator circuit 28. When the comparators 27 and 28 have coincidence outputs, address translation by the TLB is successful and the physical address part in the TLB entry and the in-page relative address in the LAR register 24 are combined in the selection gate 30, thereby the physical address for accessing the main storage area is obtained. The main storage area is accessed by using this obtained physical address and the operation proceeds.

On the other hand, if either of the comparators 27 and 28 does not issue the coincidence output, address translation by TLB 26 fails. At this time, the address translation table (segment table, page table) stored in the main storage area is read out, and a physical address is generated. First of all, the segment table heading address stored in the CR 1 register 11 and segment number stored in the LAR register 24 are added in the DAT adder 17, and the result is temporarily stored in the TR register 19. Then, well known prefix processing is performed on the content of TR register 19. The prefix processing is performed by using prefix register 18, comparator 20, and prefix register 21. Thereafter, the content of TR register 19 and the content of BASE register 14 which are prefixed are added in the DAT adder 17, and the result is stored in the TR register 19 again. The content of TR register 19 and the content of the LIMIT register 14 are compared in the comparator circuit 22. If the content of TR register 19 is larger than that of LIMIT register 14, address exception occurs and address translation is suspended. On the other hand, in the normal condition, the content of TR register 19 is smaller than the content of LIMIT register 14, and processing is continued. At this point, the TR register 19 has a stored value obtained by adding the heading address of the segment table in the CR 1 register 11, the segment number in the LAR register 24 and the value of the BASE register 14. This value is transmitted to the main storage area via selection gate 30 and may be placed in the TBL register 10 by reading the segment table entry from the segment table in the main storage area. Since some of the bits in the segment table entry read out into the TBL register 10 represent the heading address of the page table, they are added to the page number in the LAR register 24, and the result is temporarily stored in the TR register 19. Prefix processing is performed on the content of the TR register 19 as above. The content of the TR register 19 which has been subject to the prefix processing and the content of BASE register 14 are added in the DAT adder 17 and the result is stored in TR register 19 again. The content of TR register 19 and the content of the LIMIT register 14 are compared in the comparator circuit 22 as above. If no address exception occurs, processing is continued. Now, the TR register 19 has a stored value obtained by adding the heading address of the page table in the TBL register 10, the page number in the LAR register 24 and a value of the BASE register 14. This value is transmitted to the main storage area via selection gate 30, and may be placed in TBL register 10 by reading the page table entry from the page table of the main storage area. Since some of the bits in the page table entry read out into the TBL register correspond to the upper bits of the real page address, prefix processing, addition of the content of the BASE register 14 and comparison with the LIMIT register 14 are performed as explained above.

When address exception does not occur, the TR register 19 contains a value obtained by adding some of the bits of the page table entry in the TBL register 10 and a value of the BASE register 14. This value is sent to the selection gate 30. Thus, the physical address of the main storage area can be obtained by coupling the value to the in-page relative address in the LAR 24. This correspondence is stored in TLB 26 and address translation is completed.

Figure 13:
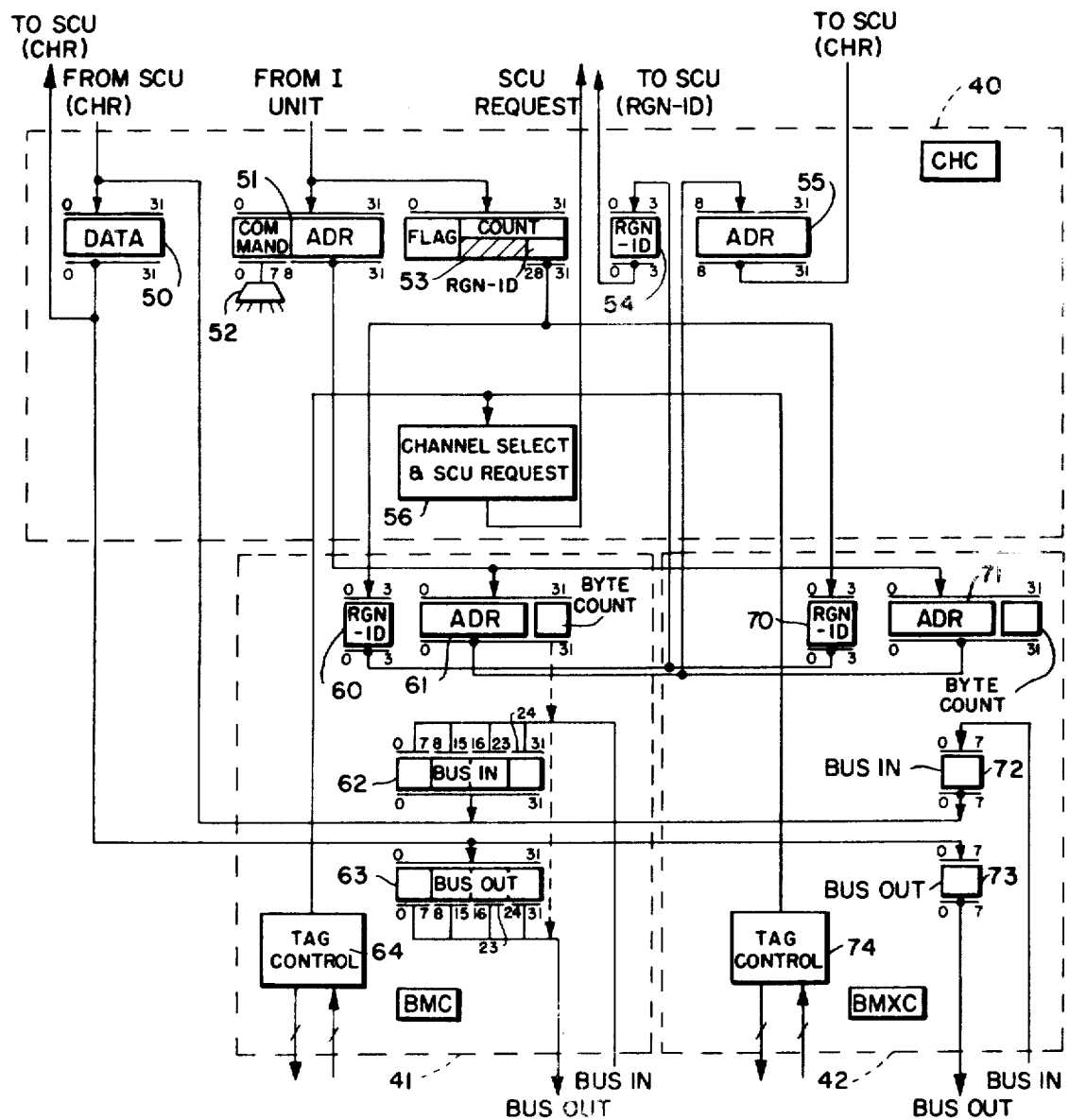
FIG. 13 is a block diagram of an embodiment of the channel control unit and channel.

Next, the operations of the channel control unit and the channel used in the first method for transmitting the region identifier will be explained by referring to FIG. 13. In FIG. 13, 40 denotes a channel control unit; 41 represents a block multiplexer channel; 42 is a byte multiplexer channel; 50 is a register for holding the data to be sent to or received from the main storage area; 51 is a register for storing command and address signals sent from the instruction unit of the CPU; 52 is a decoder for decoding the command signal; 53 is a register containing flag information, count information and the region identifier sent from the instruction unit; 54 is a register containing the identifier sent from channels; 55 is a register containing the addresses sent from the channels; 56 is a control part for controlling the channel selection and the request to the storage control unit (SCU); 60 is a register containing a region identifier sent from the channel control unit; 61 is a register containing addresses sent from the channel control unit and having a byte counter for counting bytes to be transferred; 62 is a register containing several bytes of input data sent from input/output units; 63 is a register containing several bytes of output data to be sent to input/output units; 64 is a tag control part for controlling various tag information lines between the channel and the input/output units; 70 is a register containing a region identifier sent from the channel control unit; 71 is a register containing addresses sent from the channel control unit and having byte counter for counting transfer bytes; 72 is a register containing 1 byte of input data sent from input/output units; 73 is a register containing 1 byte of output data to be sent to input/output units; 74 is a tag control part controlling various tag information lines between the channel and input/output units. The structure of FIG. 13 consisting of the channel control unit 40, block multiplexer channel 41, and byte multiplexer channel 42, is standard with the exception of the structure of the region identifier. Therefore, a detailed explanation is unnecessary.

Figure 9:
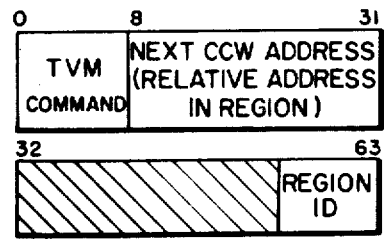
FIG. 9 shows a format of the TVM command.
Figure 10:
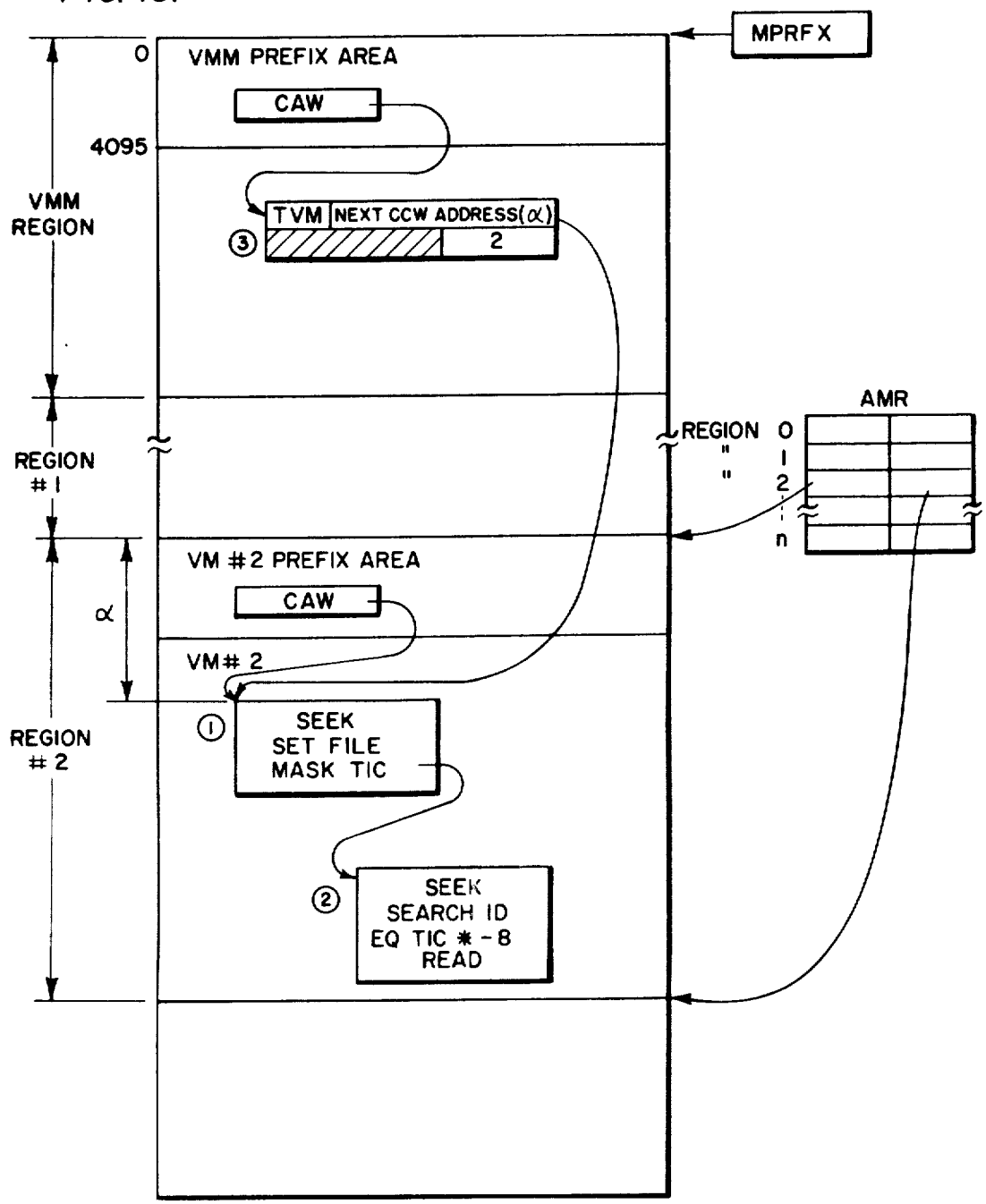
FIG. 10 is a diagram illustrating the concept of the channel program execution.

The part of the structure concerning the region identifier will be explained in detail. As shown in FIG. 9, the TVM command is given a region identifier and when the command control word (CCW) is sent to the channel control unit 40 via the instruction unit of the CPU to have the channel execute the TVM command, the channel control unit 40 sets the TVM command to the command holding part of register 51 (FIG. 13). Channel control unit 40 also sets the region identifier to the region identifier holding part of register 53. When the decoder 52 identifies the TVM command, the region identifier held in register 53 is sent to the channel where it is stored in register 60 (or 70) of channel. Thereafter, when sending address information to the storage control unit (SCU) via the channel control unit 40 in order to access the main storage area, the channel simultaneously transmits address information with a region identifier. The region identifier stored in register 60 (or 70) is sent to the storage control unit (SCU) via the register 54 in channel control unit 40.

Figure 1:
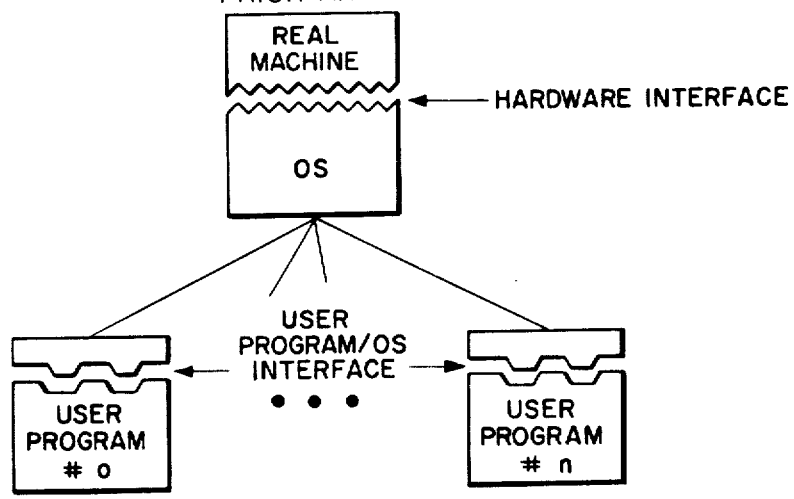
FIG. 1 is an illustration of a general machine system.
Figure 2:
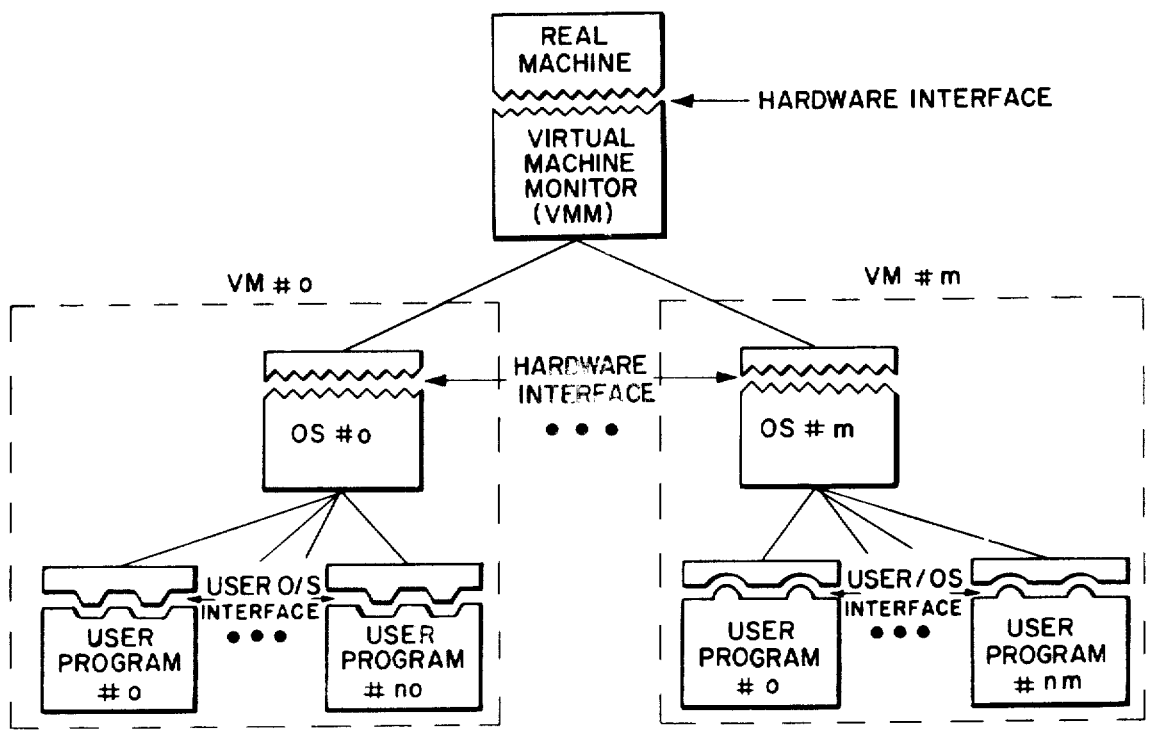
FIG. 2 is an illustration of a virtual machine system.
Figure 3:
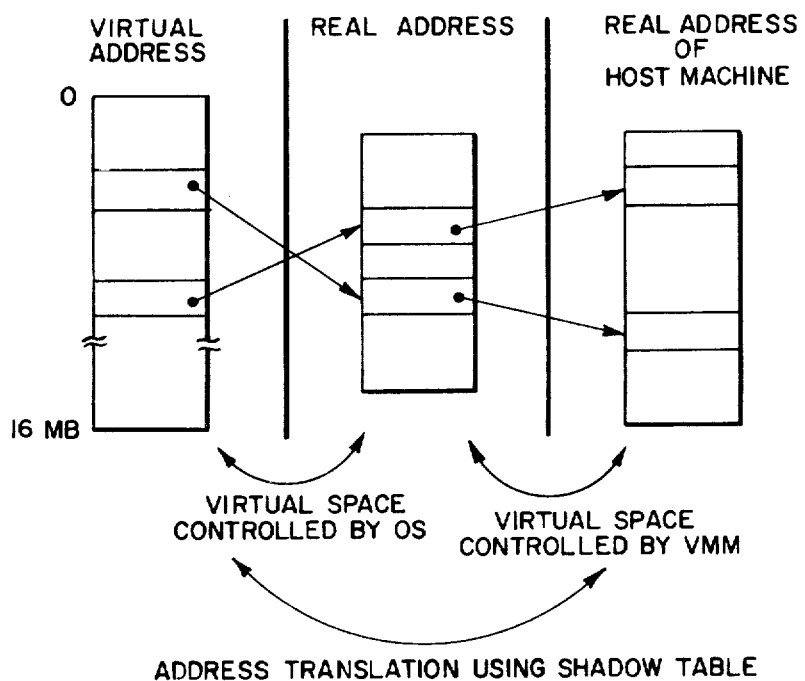
FIG. 3 illustrates the control of address space in the virtual machine system.
Figure 4:
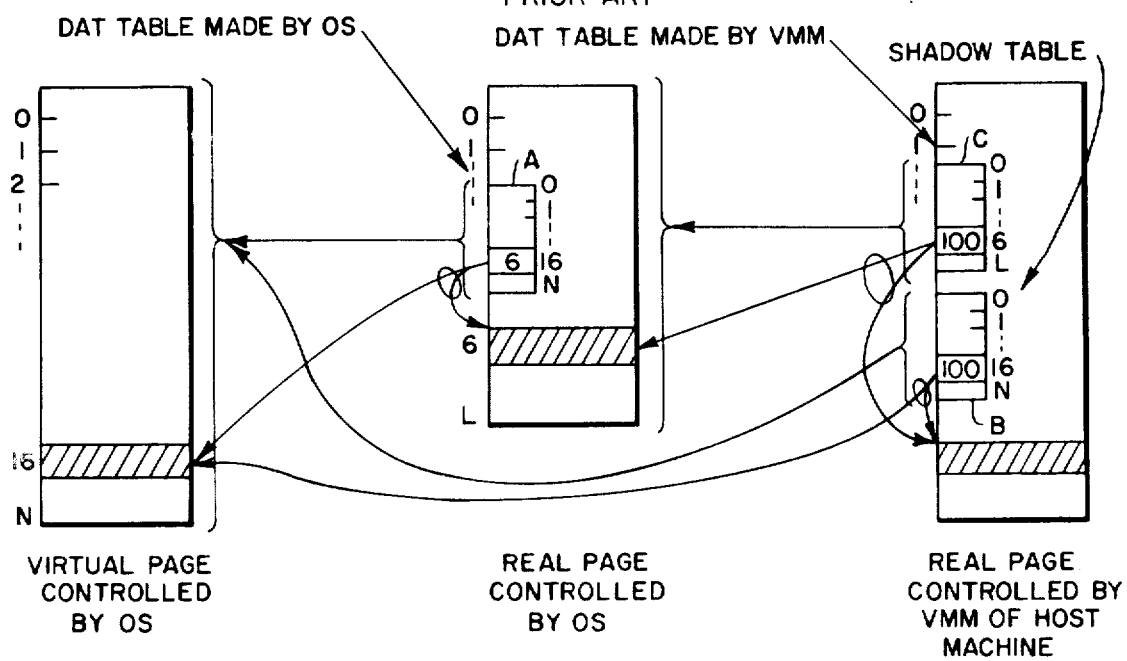
FIG. 4 illustrates an embodiment of address space in the virtual machine system.
Figure 5:
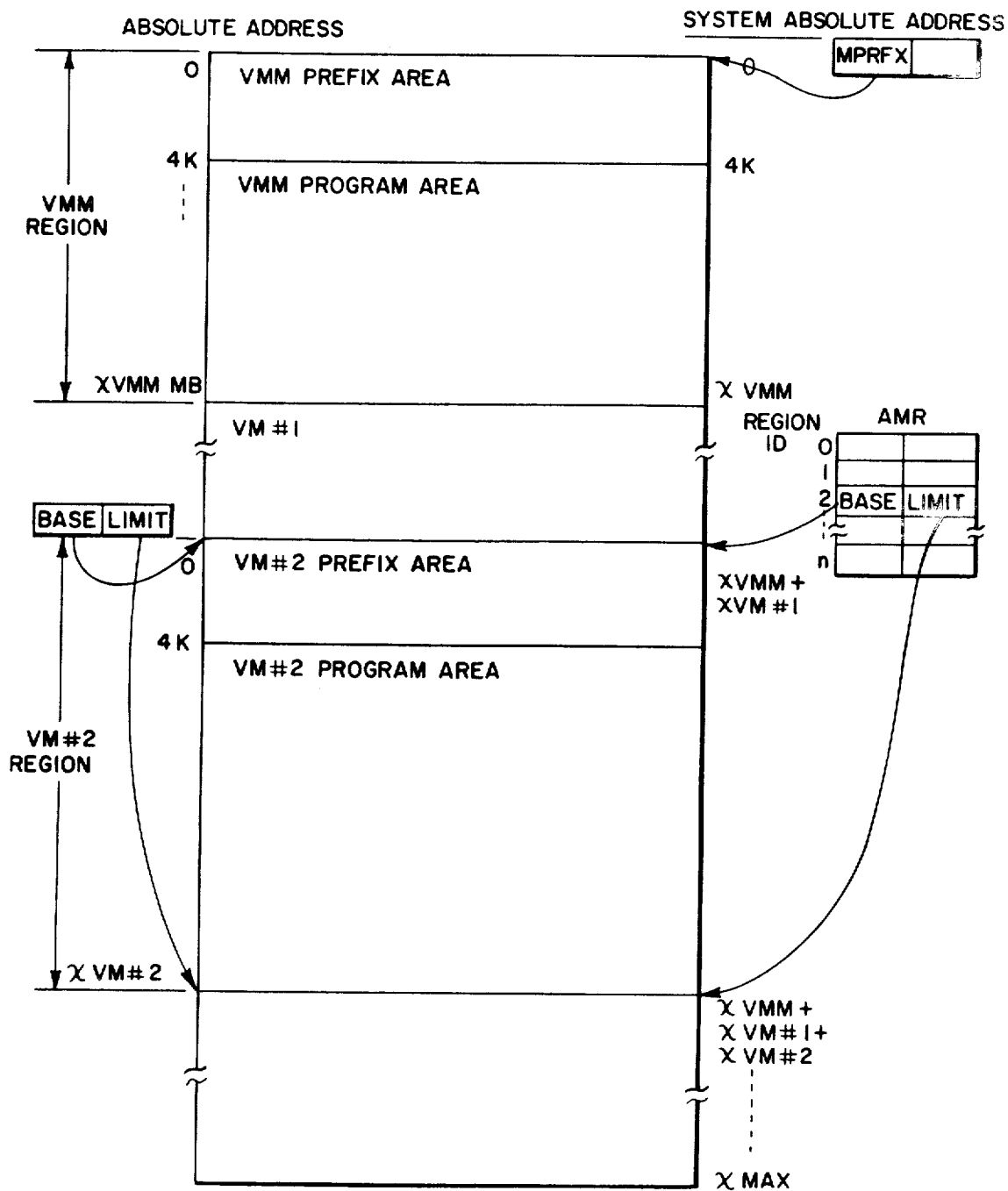
FIG. 5 illustrates the concept of the present invention.
Figure 6:
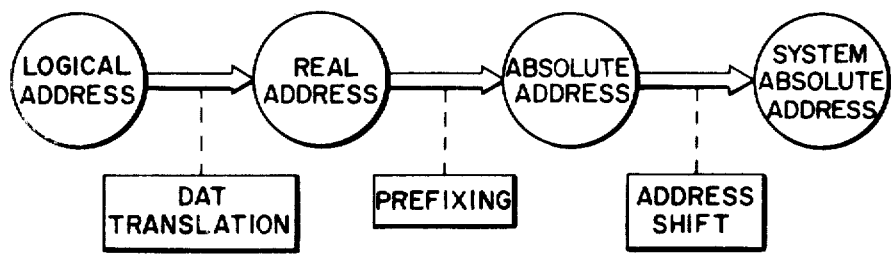
FIG. 6 illustrates a process of address translation.
Figure 7:
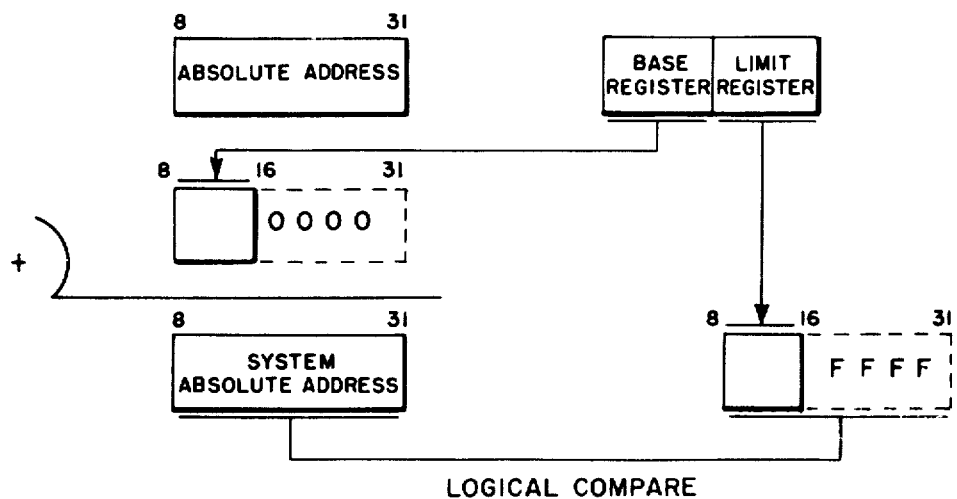
FIG. 7 illustrates the concept of address shift.
Figure 8:
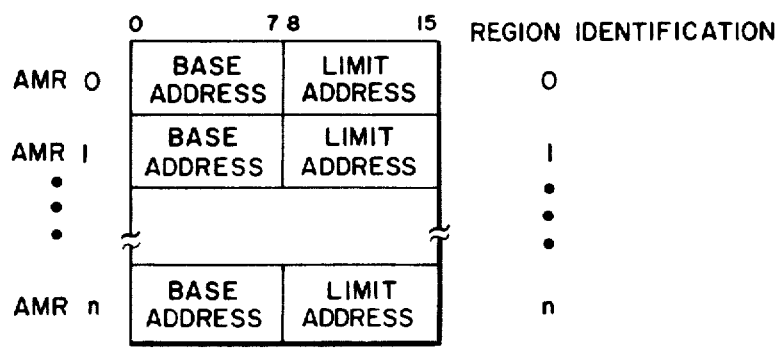
FIG. 8 represents the structure of the AMR register.

In the storage control unit (SCU), the received region identifier is stored in the register 13 shown in FIG. 12. On the other hand, address information sent from the channel is stored in the register 12 shown in FIG. 2 in the storage control unit (SCU). Then, at the time the main storage area is accessed by the channel, address translation is performed in accordance with the content of AMR register 15. The region identifier being held in the register 13 in FIG. 12 selects one of the plurality of AMR registers by means of the selection gate 16. Next, the address stored in the register 12 and the BASE address of selected AMR register are added by the DAT adder 17 and then stored temporarily in the TR register 19. Thus, the content of the TR register 19 and the LIMIT address of the selected AMR register are compared in the comparator circuit 22. When the content of the TR register 19 is smaller than the LIMIT address, the content of TR register 19 is sent to the main storage area which is accessed by the selection gate 30. On the other hand, if the result of the comparison by comparator circuit 22 indicates that the content of TR register 19 is larger than the LIMIT address, address exception occurs, and access to the main storage area is suspended.

The operations of the channel control unit and the channel in the second method for transmitting a region identifier will be explained by referring to FIG. 14. In FIG. 14, 53' is a register containing flag information and count information sent from the instruction unit as does register 53 in FIG. 13. The difference between the method of FIG. 13 and the method of FIG. 14 is that in FIG. 14 the region identifier is sent from the instruction unit (I) of the CPU.

Region identifiers are stored in the register 35 of instruction unit 3 shown in FIG. 12. The main storage area is accessed in accordance with the content of the instruction counter 32. Instruction read out from the main storage area is transmitted to the instruction buffer 33 via the DATA register 31 of the storage control unit. If the instruction decoded by the decoder 34 instructs that data be transferred to the channel, the region identifiers in the register 35 are transmitted to the RGN-ID register 60 (or 70) in the channel via the channel control unit 40. The succeeding accessing of the main storage area by the channel is conducted in the same manner as in FIG. 13. Therefore, a separate explanation of this operation is not necessary. According to the methods shown in FIG. 13 and FIG. 14, an address shift is conducted by the region identifier and the AMR register. Thus, the designated continuous region beginning from address 0 on the program can be freely accessed by each channel.

As described previously, in the present invention, a means for designating the accessible region on the main storage area is provided and address translation is automatically carried out when the main storage area is accessed by the CPU or channel. Thereby, the overhead for supporting the virtual storage function in the virtual machine system where plural operating systems are simultaneously operated can be reduced. In addition, the CCW modification by user programs can also be supported.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A channel address control system for reducing the overhead for supporting the virtual storage function of a virtual machine system having a main storage area for storing data transfer instructions, channels for executing respective plural control programs, and a central processing unit for providing region identification information and for executing a monitor program for monitoring said plural control programs, said plural control programs being operated on the virtual machine system under the control of said monitor program, each of said channels providing a main storage address, continuous regions of the main storage area being exclusively assigned for access by corresponding ones of the plural control programs, respectively, each assigned continuous region being described by a heading address and a trailing address, comprising:

at least one register for storing, as identifying information, the heading addresses and trailing addresses of the continuous regions of the main storage area assigned to respective ones of the control programs;

transmission means, operatively connected to the central processing unit and to the channels, for transmitting the region identification information to identify one of the continuous regions to one of the channels;

first means, operatively connected to said transmission means and located in said one of the channels, for storing said region identification information;

second means, operatively connected to said at least one register, the channels, and to said main storage area, for adding the heading address of the continuous region identified by the region identification information stored in said first means to the main storage address provided by said one of the channels, so that a system absolute address is obtained; and third means, operatively connected to said second means, said at least one register and to said central processing unit, for comparing said system absolute address with the trailing address of the continuous region identified by the region identification information, said third means transmitting an address exception signal to said central processing unit if the result of the comparison indicates that said system absolute address corresponds to a portion of the main storage area outside the continuous region identified by the region identification information, said main storage area being accessed in dependence upon said system absolute address, said transmission means comprising:

fourth means, operatively connected to the main storage area, for decoding one of the data transfer instructions for one of the channels;

fifth means, operatively connected to said fourth means, for storing the region identification information for said one of the channels; and sixth means, operatively connected to said fifth means, for transmitting the region identification information to said one of the channels when the data transfer instruction is decoded, whereby the overhead for memory mapping is reduced.

2. A channel address control system for a virtual machine system as set forth in claim 1, wherein said transmission means further comprises:

seventh means, operatively connected to the central processing unit, for transmitting a channel command signal, including the region identification information, to one of the channels.

3. A channel address control system for a virtual machine system as set forth in claim 1 or 2, further comprising accessing means, operatively connected to said second means and the main storage area, for accessing the main storage area, wherein said accessing means includes a buffer mechanism.

4. A channel address control system for reducing the overhead for supporting the virtual storage function of a virtual machine system having a main storage area, a central processing unit for providing a currently effective storage number and for executing a monitor program for monitoring plural control programs, and an input/output unit, said main storage area storing address translation table data and instruction signal data, said plural control programs being operated on the virtual machine system under the control of the monitor program, said channel address control system comprising:

a storage control unit, operatively connected to said main storage area, for controlling the accessing of the main storage area;

a plurality of channels, operatively connected to said input/output unit, for respectively executing said plural control programs, each of said channels providing channel data including a first region identifier and channel address data; and a channel control unit, operatively connected to said storage control unit and to said plurality of channels, for controlling the flow of data to and from said plurality of channels;

said storage control unit comprising:

a first register, operatively connected to said main storage area, for storing said address translation table data read out from said main storage area;

a second register, operatively connected to said plurality of channels, for storing said channel address data;

a first region register, operatively connected to said plurality of channels, for storing said first region identifier sent from one of said plurality of channels;

a third register, operatively connected to said first region register, for storing address modification information, representing continuous regions of the main storage area exclusively assigned to respective ones of said plural control programs, a portion of said address modification information being selected in dependence upon the first region identifier;

a fourth register, operatively connected to said central processing unit, for storing the currently effective storage number representing one of said plural control programs;

a fifth register, operatively connected to said central processing unit, for storing logical address data and address in page data;

a high speed buffer circuit, operatively connected to said first register, for performing address translation and for providing an identification output representing one of the control programs, a physical address output, and a logical address output, said high speed buffer circuit being indexed by said logical address data;

a sixth register, operatively connected to said high speed buffer circuit, for reading and writing data to or from said high speed buffer circuit;

a first comparator circuit, operatively connected to said fifth register and said high speed buffer circuit, for comparing said logical address data with said logical address output and for providing a first coincidence output;

a second comparator circuit, operatively connected to said fourth register and said high speed buffer circuit, for comparing said currently effective storage number with said identification output and for providing a second coincidence output;

a seventh register for storing a segment table heading address;

a dynamic address translation adder circuit, having inputs and outputs, said inputs operatively connected to each of said seventh register, said fifth register, said third register, said second register and said first register, for adding address data and for providing a sum output;

an eight register, operatively connected to the outputs of said dynamic address translation adder circuit, for storing said sum output;

a third comparator circuit, operatively connected to said third register and said eighth register, for comparing said stored sum output to said selected address modification information and for providing an address exception signal to the central processing unit if the comparison result indicates that the stored sum output indicates an address in the main storage area outside the continuous region identified by the first region identifier;

a first selection gate, operatively connected to said first and second comparator circuits, said high speed buffer circuit, and said fifth register, for accessing the main storage area on the basis of the physical address output of said high speed buffer circuit and the address in page data stored by said fifth register in dependence upon the state of said first and second coincidence outputs; and prefixing means, operatively connected to an input of said dynamic address translation adder circuit and to said eighth register, for performing prefix processing on the content of said eighth register and for providing a prefix processing output to the input of said dynamic address translation adder circuit, whereby the overhead for memory mapping is reduced.

5. A channel address control system for a virtual machine system as set forth in claim 4, further comprising an instruction unit operatively connected to said storage control unit, wherein said instruction unit comprises:

an instruction counter circuit, operatively connected to said fifth register, for counting instructions;

an instruction buffer circuit, operatively connected to said instruction counter circuit and to said storage control unit, for reading out said instruction signal data from the main storage area in dependence upon the count information of said instruction counter circuit;

an instruction decoder circuit, operatively connected to said instruction buffer circuit, for decoding said instruction signal data read out from the main storage area; and a second region register, operatively connected to said instruction decoder circuit and to said channel control unit, for providing one of a plurality of region identifiers, as said first region identifier, to said channel control unit in dependence upon the output of said instruction decoder circuit.

6. A channel address control system for a virtual machine system as set forth in claim 5, wherein said instruction unit generates command and address signals, and flag information, and wherein said channel control unit comprises:

a data register, operatively connected to said storage control unit, for storing data to be sent to or received from the main storage area;

a ninth register, operatively connected to said instruction unit, for storing said command and address signals sent from said instruction unit;

a tenth register, operatively connected to said instruction unit, for storing said flag information and said count information received from said instruction unit;

a third region register, operatively connected to said plurality of channels and to said first region register, for storing said first region identifier;

an eleventh register, operatively connected to said plurality of channels and to said second register, for storing said channel address data; and a channel selection control requester circuit, operatively connected to said storage control unit and to said plurality of channels, for controlling channel selection and requests to said storage control unit.

7. A channel address control system for a virtual machine system as set forth in claim 6, wherein said plurality of channels comprise a block multiplexer channel, operatively connected to said channel control unit and said input/output units, for multiplexing multiple byte data; and a byte multiplexer channel, operatively connected to said channel control unit and said input/output units, for multiplexing single byte data.

8. A channel address control system for a virtual machine system as set forth in claim 7, wherein said block multiplexer channel comprises:

a fourth region register, operatively connected to said second region register and said third region register, for storing said first region identifier;

a twelfth register, operatively connected to said ninth register and said eleventh register, for storing said address signal sent from said instruction unit;

a thirteenth register, operatively connected to said storage control unit and said input/output units, for storing multiple byte input data;

a fourteenth register, operatively connected to said storage control unit and said input/output units, for storing multiple byte output data.

9. A channel address control system for a virtual machine system as set forth in claim 8, wherein said byte multiplexer channel comprises:

a fifth region register, operatively connected to said second region register and said third region register, for storing said first region identifier;

a fifteenth register, operatively connected to said ninth register and said eleventh register, for storing said address signal sent from said instruction unit;

a sixteenth register, operatively connected to said thirteenth register and said input/output units, for storing single byte input data; and a seventeenth register, operatively connected to said fourteenth register and said input/output units, for storing single byte output data.

10. A channel address control system for a virtual machine system as set forth in claim 5, wherein said instruction unit generates command and address signals, and flag information, and wherein said channel control unit comprises:

a data register, operatively connected to said storage control unit, for storing data to be sent to or received from the main storage area;

a ninth register, operatively connected to said instruction unit, for storing said command and address signals sent from said instruction unit;

a tenth register, operatively connected to said instruction unit, for storing said flag information, said count information, and said first region identifier received from said instruction unit;

a third region register, operatively connected to said plurality of channels and to said first region register, for storing said first region identifier;

an eleventh register, operatively connected to said plurality of channels and to said second register, for storing said channel address data; and a channel selection control request circuit, operatively connected to said storage control unit and to said plurality of channels, for controlling channel selection and requests to said storage control unit.

11. A channel address control system for a virtual machine system as set forth in claim 10, wherein said plurality of channels comprise a block multiplexer, operatively connected to said channel control unit and said input/output units, for multiplexing multiple byte data; and a byte multiplexer channel, operatively connected to said channel control unit and said input/output units, for multiplexing single byte data.

12. A channel address control system for a virtual machine system as set forth in claim 11, wherein said block multiplexer channel comprises:

a fourth region register, operatively connected to said tenth register and said third region register, for storing said first region identifier;

a twelth register, operatively connected to said ninth register and said eleventh register, for storing said address signal sent from said instruction unit;

a thirteenth register, operatively connected to said storage control unit and said input/output units, for storing multiple byte input data;

a fourteenth register, operatively connected to said storage control unit and said input/output units, for storing multiple byte output data.

13. A channel address control system for a virtual machine system as set forth in claim 12, wherein said byte multiplexer channel comprises:

a fifth region register, operatively connected to said tenth register, for storing said first region identifier;

a fifteenth register, operatively connected to said ninth register, and said eleventh register, for storing said address signal sent from said instruction unit;

a sixteenth register, operatively connected to said thirteenth register and said input/output units, for containing single byte input data; and a seventeenth register, operatively connected to said fourteenth register and said input/output units, for containing single byte output data.

14. A channel address control system for reducing the overhead for supporting the virtual storage function of a virtual machine system having a main storage area for storing data transfer instructions, and a central processing unit for providing a currently effective storage number and for executing a monitor program for monitoring plural control programs, said plural control programs being operated on the virtual machine system under the control of the monitor program, said channel address control system comprising:

a storage control unit, operatively connected to said main storage area, for controlling the accessing of the main storage area;

a plurality of channels, for respectively executing said plural control programs, each of said channels providing a first region identifier and channel address data;

a channel control unit, operatively connected to said storage control unit and to said plurality of channels, for controlling the flow of data to and from said plurality of channels; and an instruction unit;

said storage control unit comprising:

a first register, operatively connected to said plurality of channels, for storing said channel address data;

a second register, operatively connected to said plurality of channels, for storing the first region identifier sent from one of said plurality of channels;

a third register, operatively connected to said second register, for storing address modification information representing continuous regions of the main storage area exclusively assigned to respective ones of said plural control programs, a portion of said address modification information being selected in dependence upon the first region identifier;

a dynamic address translation adder circuit, operatively connected to said first register and said third register, for adding said channel address data to the selected address modification information to generate a system absolute address for accessing said main storage area;

a comparator circuit, operatively connected to said dynamic address translation adder circuit and said third register, for comparing said sum output to said selected address modification information and for transmitting an address exception signal to the central processing unit if the comparison result indicates that the system absolute address is an address in the main storage area outside the continuous region identified by said first region identifier;

said instruction unit comprising:

first means, operatively connected to the main storage area, for decoding one of the data transfer instructions for one of said plurality of channels;

second means, operatively connected to said first means, for storing region identification information for said one of said plurality of channels, the region identification information indicating the one of the continuous regions of the main storage area exclusively assigned to the corresponding said one of said plural control programs;

said channel control unit comprising third means, operatively connected to said second means, for transmitting the region identification information to said one of said plurality of channels when the data transfer instruction is decoded, the region identification information corresponding to the first region identifier for said one of the plurality of channels, whereby the overhead for memory mapping is reduced.

* * * * *

UNITED STATES PATENT AND TRADEMARK OFFICE
CERTIFICATE OF CORRECTION

PATENT NO. : 4,459,661
DATED : JULY 10, 1984
INVENTOR(S) : SABURO KANEDA ET AL.

It is certified that error appears in the above-identified patent and that said Letters Patent is hereby corrected as shown below:

FRONT PAGE [75] Inventors,
  line 1, "Kaneda; Masamichi Ishibashi;" should be --Kaneda, Yokohama; Masamichi Ishibashi, Kawasaki--;

line 2, "Seta; Fujio Ikegami," should be --Seta, Numazu; Fujio Ikegami, Yokohama;--;

line 3, delete "Kanagawa".

[56] References Cited

OTHER PUBLICATIONS
  line 2, "LBU" should be --IBM--;
  line 6, "T.P." should be --J.P.--;
  line 8, "Concept" should be --Concepts--.

Col. 1, line 67, "non-priviledged" should be --non-privileged--.

Col. 2, line 1, "ledged" should be --leged--.

UNITED STATES PATENT AND TRADEMARK OFFICE
CERTIFICATE OF CORRECTION

PATENT NO. : 4,459,661
DATED : JULY 10, 1984
INVENTOR(S) : SABURO KANEDA ET AL.

It is certified that error appears in the above-identified patent and that said Letters Patent is hereby corrected as shown below:

Col. 5, line 68, "10" should be --10,--.

Col. 6, line 1, "operation" should be --operating--.

Col. 11, line 52, "1 or 2," should be --1,--.

Col. 15, line 23, "twelth" should be --twelfth--.

Signed and Sealed this

Nineteenth Day of February 1985

[SEAL]

Attest:

DONALD J. QUIGG

Attesting Officer

Acting Commissioner of Patents and Trademarks